United States Patent [19]

Jindrick

[11] 4,094,190

[45] June 13, 1978

[54] COMPRESSION MEASURING APPARATUS

[75] Inventor: James A. Jindrick, Kenosha, Wis.

[73] Assignee: Snap-on Tools Corporation, Kenosha, Wis.

[21] Appl. No.: 836,597

[22] Filed: Sep. 26, 1977

[51] Int. Cl.² .......................................... G01M 15/00
[52] U.S. Cl. .................................................. 73/115
[58] Field of Search ...................... 73/115, 116, 117.2, 73/117.3, 389, 391

[56] References Cited

U.S. PATENT DOCUMENTS 3,713,331  1/1973  Peterson et al. ..................... 73/117.2

Primary Examiner—Anthony V. Ciarlante

Attorney, Agent, or Firm—Vogel, Dithmar, Stotland, Stratman & Levy

[57] ABSTRACT

A transducer produces a sequence of pulses corresponding to the compressions in the chambers of an internal combustion engine. Gating signals are produced in substantial time coincidence with these compression pulses. A number of channels are coupled in parallel corresponding to the number of chambers of which compression is to be measured. The channels are successively rendered operative by the gating signals which detect the amplitude of the compression pulses, by peak detection or counting clock pulses, for example. An annunciator is coupled to the several channels to express sequentially the information stored therein.

30 Claims, 7 Drawing Figures

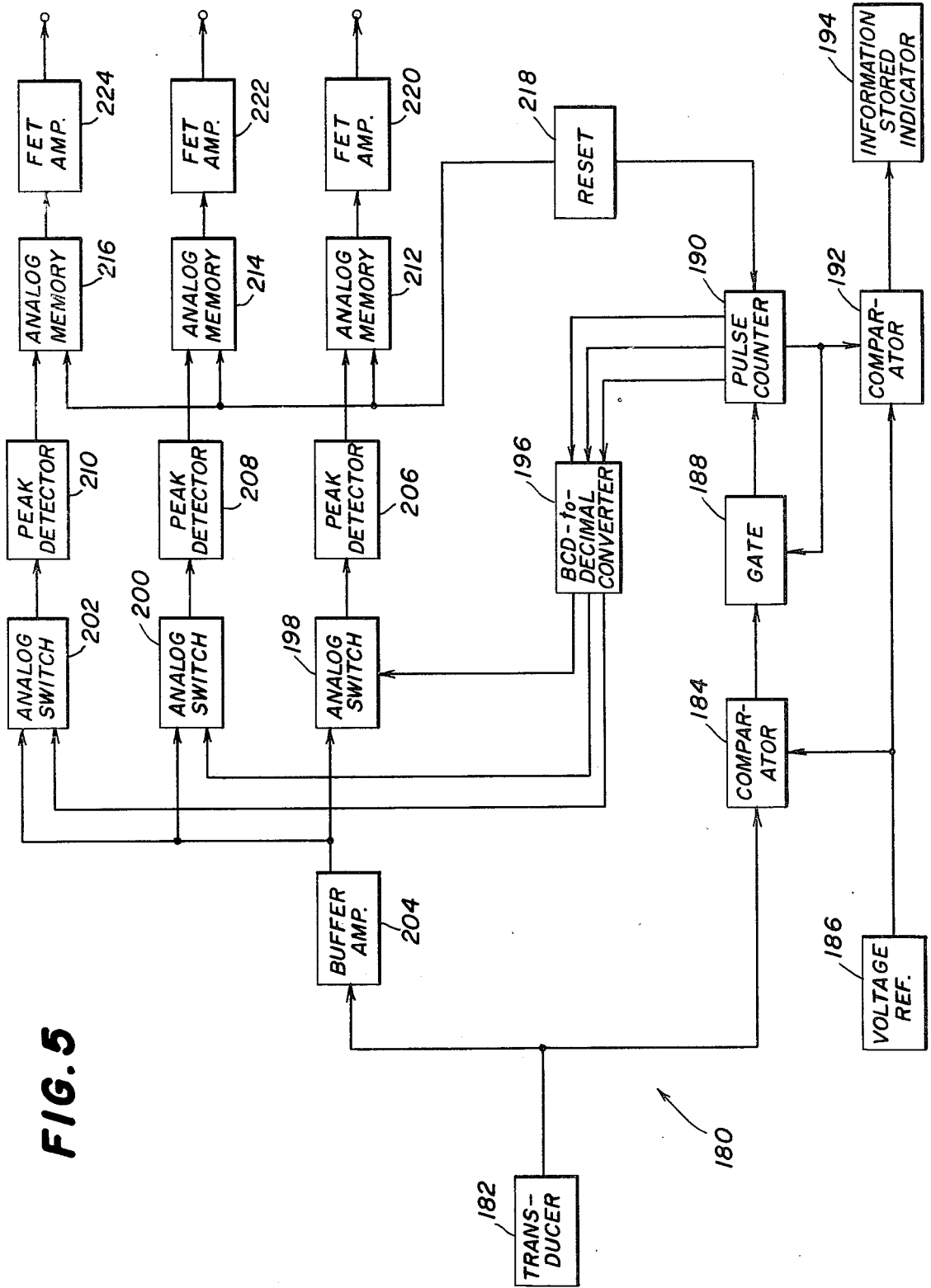

COMPRESSION MEASURING APPARATUS

BACKGROUND OF THE INVENTION

One of the many measurements made of an internal combustion engine to evaluate its performance is the peak compression in the various compression chambers. If the readings do not meet manufacturers' specifications, the mechanic knows that the engine is not functioning properly. He then follows a standardized procedure to correct the problem so that the peak compression in each chamber does meet the specifications.

Currently, peak compression readings are obtained for a given cylinder by removing the associated spark plug and replacing it with a compression gauge. Such instrument has a threaded end matching the threaded end of the spark plug so that it can be screwed into the spark plug opening of the cylinder. The gauge has a pointer rotatable on a dial calibrated in pounds per square inch. The automobile starter is operated to cause the pistons to operate, thereby varying the compression in the cylinder. The mechanic watches the gauge as the pointer moves between the minimum and maximum positions caused by the increases and decreases of the compression in the cylinder. He notes the maximum reading, which corresponds to peak compression in that cylinder. He performs similar steps for each cylinder in the engine. In this manner, a mechanic is able to make reasonably accurate readings of peak compression in the cylinders of a standard internal combustion engine.

However, in a rotary internal combustion engine, each spark plug is associated with three combustion chambers rather than the single combustion chamber in the cylinder of a standard engine. As the rotor of a rotary engine spins, it presents to the associated spark plug, three different combustion chambers, one after another. A mechanical gauge as described above inserted in place of the spark plug would be difficult, if not impossible, to read accurately, particularly since peak compression for each chamber may not be the same. The mechanic would have to watch the gauge as the pointer moves back and forth through peaks at the rate of 15 to 20 times a second.

There have been efforts directed to designing a compression measuring apparatus that is electronic, that is to say, apparatus that produces electrical signals corresponding to the compressions in an internal combustion engine. Such efforts have not, however, been usable in rotary engines. For example, U.S. Pat. No. Re. 29,109 to Petersen et al., for Apparatus for the Determination of Internal Combustion Engine Compression Pressure, discloses a device of this nature for measuring peak compression in a standard internal combustion engine. This patent does not disclose how to obtain accurate digital readings of the compression. Also, the Petersen et al. apparatus suffers the disadvantages of not having means to apprise the mechanic that the information on compression has been stored. The use of engine current to provide electrical indication of compression, as suggested by this patent, undesirably causes the readings to be affected by extraneous factors such as battery voltage and ground series resistance. Finally, the use of delay as a means to insure that the engine has reached steady state, as disclosed in the patent, is not sufficiently accurate.

SUMMARY OF THE INVENTION

It is therefore an important object of the present invention to provide apparatus for measuring peak compression in a rotary engine.

Another object is to provide compression measuring apparatus for internal combustion engines, which provides accurate digital readings.

Another object is to provide compression measuring apparatus with an indicator to show that compression pulses are being received thereby and an indicator to show that the information on the peak compression in all three chambers of a rotary engine has been developed and stored.

Another object is to provide compression measuring apparatus in which a transducer is used to replace the spark plug and provide electrical pulses representative of the compression in the compression chambers.

Another object is to provide compression measuring apparatus which skips a fixed number of compressions before readings are taken.

In summary, there is provided apparatus for measuring peak compression in each of a plurality of compression chambers of an internal combustion engine, the apparatus comprising means for producing a sequence of compression pulses respectively corresponding to the compressions in the chambers, means coupled to the compression pulse producing means for producing a sequence of a plurality of gating signals corresponding in number to the number of compression chambers and respectively in substantial time coincidence with compression pulses subsequent to the second one of the compression pulses, a plurality of channels coupled in parallel and corresponding in number to the number of chambers of which the compression is to be measured, each of the channels having detecting means and memory means, a signal input coupled to the compression pulse producing means and a control input coupled to the gating signal producing means and being operative to detect the amplitude of the compression pulses and to store information representative of such amplitude.

In another aspect of the invention, there is provided apparatus for measuring peak compression in each of a plurality of compression chambers of an internal combustion engine, the apparatus comprising means for producing a sequence of compression pulses respectively corresponding to the compressions in the chambers, comparator means coupled to the transducer means and being responsive to current caused by the compression pulses exceeding a threshold level to produce an enable signal, circuit means including a clock for producing a sequence of clock pulses at a frequency many times the frequency of the compression pulses, the circuit means having an output and a control input coupled to the comparator means, the circuit means being responsive to the enable signal to couple clock pulses to the output and being responsive to the absence of the enable signal to isolate the clock pulses from the output, feedback counter means coupled to the output of the circuit means for counting clock pulses coupled therethrough, the feedback counter means having a reset input coupled to receive the compression pulses and being reset after the peak of each compression pulse, a variable current sink coupled to the feedback counter means and being operative to drain a quantity of current that increases with the number of clock pulses applied thereto, the variable current sink being coupled to the transducer means and in parallel with the comparator means and being operative to divert current therefrom in accordance with the value of the sink, the commencement of a compression pulse causing current to the comparator means to be greater than the threshold level to enable the circuit means to couple the clock pulses to the output thereof, the feedback counter means counting the clock pulses to increase the current diverted by the variable current sink and thereby decrease current to the comparator means below the threshold level to preclude additional clock pulses from being coupled to the output of the circuit means, whereupon current into the comparator means again increases above the threshold level to cause the circuit means then to couple to the output thereof additional clock pulses which are further counted by the feedback counter means to increase the current diverted by the variable current sink, the circuit means thereby being periodically enabled to couple to the output thereof clock pulses until the amplitude of the compression pulse reaches a peak and begins to decrease, means for producing a sequence of a plurality of gating signals corresponding in number to the number of compression chambers and respectively corresponding to the compression pulses, a plurality of counting channels coupled in parallel and corresponding in number to the number of chambers of which the compression is to be measured, each channel having a signal input coupled to the output of the circuit means and a control input coupled to the gating signal producing means, each channel being rendered operative by a gating signal to count the clock pulses and to store such count, and annunciator means coupled to the counting channels for expressing information in accordance with the counts stored therein.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the invention.

BRIEF DESCRIPTION OF THE DRAWINGS

For the purpose of facilitating an understanding of the invention, there are illustrated in the accompanying drawings, preferred embodiments thereof, from an inspection of which, when considered in connection with the following description, the invention, its construction, and operation, and many of its advantages should be readily understood and appreciated.

FIG. 5 is a block diagram of a second embodiment of the present invention.

DESCRIPTION OF THE PREFERRED EMBODIMENTS

Figure 1A:
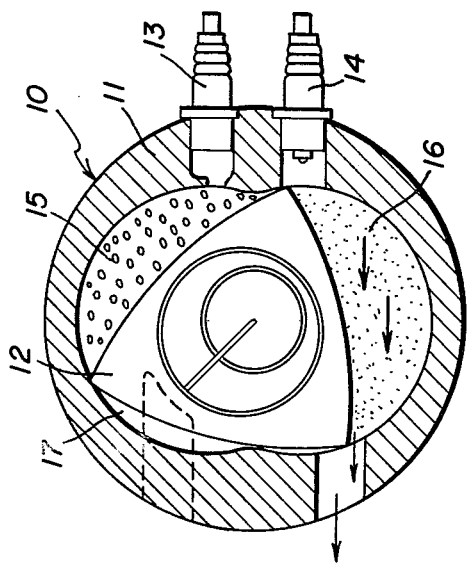
FIG. 1 depicts schematic illustrations of two positions of the rotor in an internal combustion rotary engine, of which the compression is to be measured.
Figure 1B:
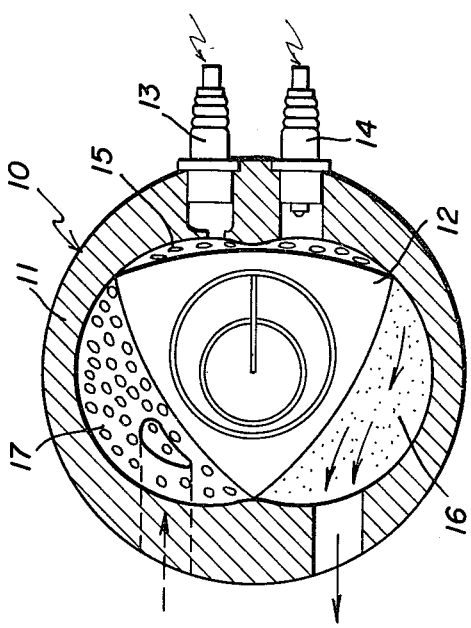

Turning now to FIG. 1, there are depicted two diagrams of a rotary engine 10 in transverse cross-section, respectively corresponding to two conditions during a cycle. The engine 10 includes an engine block 11 having rotatably mounted therein a pair of rotors, one of which is shown and marked 12. Adjacent to each rotor is a pair of spark plugs, the spark plugs 13 and 14 being associated with the rotor 12. As the rotor 12 rotates, it defines three compression chambers 15, 16 and 17, the size of each of which chambers changes as the rotor rotates. For example, the chamber 15 has its largest size in the condition of the engine 10 shown in FIG. 1A and its smallest size in the condition of the engine shown in FIG. 1B. Similarly, the other two chambers, 16 and 17, change in size in accordance with the position of the rotor 12. Both spark plugs 13 and 14 are in use when the engine is operating at low engine speeds but fire at slightly different angular positions of the rotor. At higher speeds, the spark plug 14 is idle.

Using the chamber 15 as exemplary, the compression therein in the position of FIG. 1A is lowest, while in the position of FIG. 1B it is highest. However, as can be readily seen, the chamber 17 follows the chamber 15 in facing relationship to the spark plug 13, whereby its compression will then be reflected in the readings on the gauge. Then the chamber 16 will be before the spark plug 13. This process is continually repeating as the three chambers sequentially pass by the spark plug 13. If, as in the past, a mechanical gauge was used to measure peak compression by threading it into the opening of the spark plug 13, the pointer would rapidly move back and forth, and it would be very difficult, if not impossible, to make any readings and/or determine which chamber corresponds to which reading.

Figure 2B:
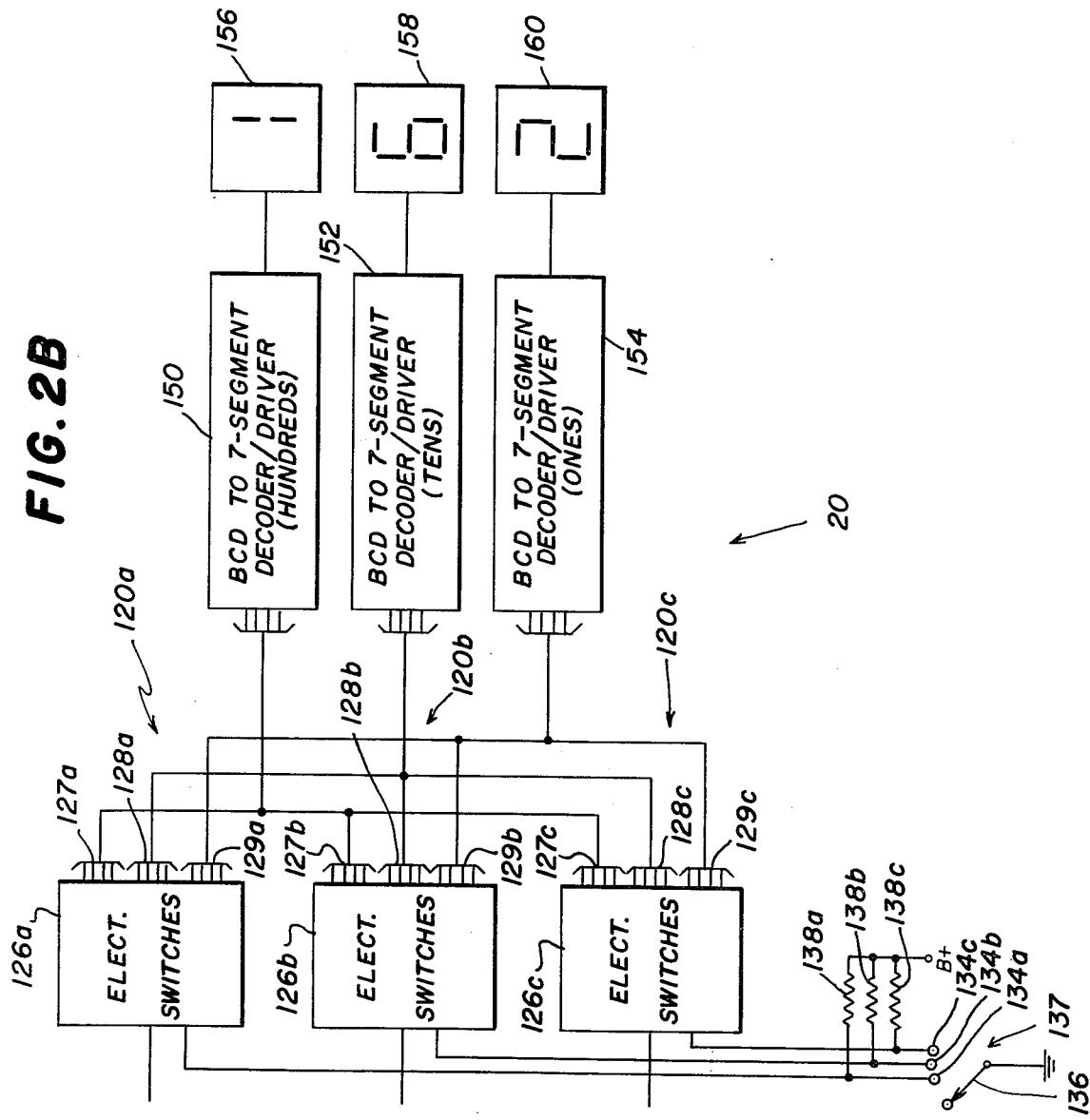
FIG. 2B is a diagram like FIG. 2A depicting the balance of the apparatus.
Figure 2A:
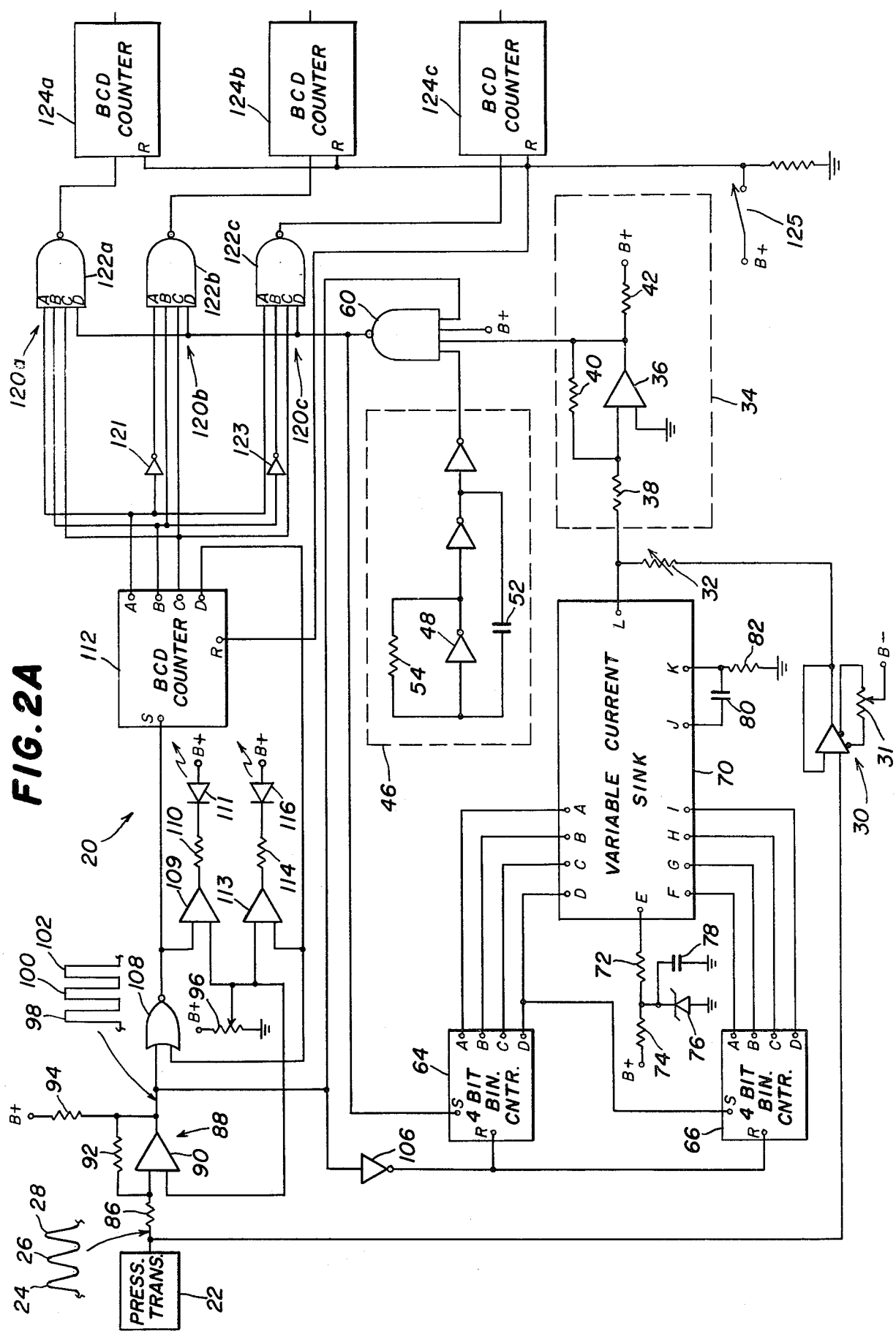
FIG. 2A is a diagram partially in schematic and partially in block, depicting a portion of compression measuring apparatus incorporating the features of the present invention.

Turning now to FIGS. 2A and 2B, there is shown compression measuring apparatus 20 that can be used to measure peak compression in each of the three chambers 15, 16 and 17. The apparatus 20 comprises a pressure transducer 22 which converts the rising and falling compression in the compression chambers into electrical pulses. The housing of the transducer 22 has a base shaped like the base of a spark plug so that it can be threaded into an opening in the engine block in place of a spark plug. An exemplary such transducer is made by National Semiconductor Corporation of Santa Clara, Calif. under the model no. LX1430A. The transducer 22 produces a sequence of pulses exemplified by the wave form shown at its output. Such wave form includes three such pulses 24, 26 and 28, in the middle of a sequence, respectively corresponding to the compression characteristics of the three chambers 15, 16 and 17 of the engine 10 shown in FIG. 1. The first pulse 24 corresponds to the compression characteristic of the chamber 15. In the condition shown in FIG. 1A in which the chamber 15 is largest, the compression will be lowest, corresponding to a valley on the wave form, whereas in FIG. 1B when the size of the chamber 15 is smallest, the compression will be highest, corresponding to a peak on the wave form. As the rotor 12 continues to spin, the compression in the chamber 15 will again drop. This rise and fall of compression in the chamber 15 causes the pulse 24 to be produced. Although the pulse 24 is shown symmetrical, it may not be, depending upon the exact configuration of the chambers. The compression in the chamber 17 will cause the pressure transducer 22 to produce the pulse 26. The pulse 28 will then be produced as the result of the compression characteristic of the chamber 16. Although not shown, the train or sequence of pulses is continuous, so that a pulse 24 will follow pulse 28, and so forth.

The sequence of compression pulses is applied to a buffer amplifier 30, having a potentiometer 31 to adjust offset error. The output of the buffer amplifier 30 is coupled by way of a calibrating potentiometer 32 to a comparator 34, which comparator includes an operational amplifier 36 having one input grounded and the second input coupled through a resistor 38 to the potentiometer 32. Positive feedback is provided by way of a resistor 40. The output of the operational amplifier 36 is coupled through a load resistor 42 to the B+ supply voltage.

The buffer amplifier 30 provides a sequence of current pulses corresponding to the sequence of compression pulses. These current pulses are applied through the potentiometer 32 and the resistor 38 to the op amp 36. The op amp 36 has a threshold conduction level, and if the current thereinto exceeds such level, then its output becomes "high," whereas when the current into the amplifier 36 is less than the threshold value, the output remains "low." The high output constitutes an enable signal.

The apparatus 20 further comprises a clock 46, which clock includes a pair of inverters 48 and 50, a capacitor 52 and a resistor 54, connected as shown to define an astable multivibrator which produces a continuous sequence of clock pulses amplified and inverted by an inverter 56. The frequency of the clock pulses produced by the clock 46 is many times the frequency of the compression pulses from the pressure transducer 22. For example, the frequency of the compression pulses may be five to seven pulses per second while the clock frequency may be 230 KHz. This relationship is important in order for the apparatus 20 accurately to relate the readings to peak compression.

The apparatus 20 further comprises a four-input NAND gate 60, one input being connected to the clock 46, a control input being coupled to the comparator 34, a further input being coupled to the supply voltage and a final input to be described hereinafter. For the purpose of the immediately ensuing discussion, it will be assumed that the final input receives a DC voltage.

The enable signal from the comparator 34 produced in the presence of a compression pulse described above, enables the NAND gate 60 so that clock pulses from the clock 46 are coupled to the output of such gate. On the other hand, during the absence of the enabling signal, the NAND gate 60 is not operative and no clock pulses are coupled to its output.

The apparatus 20 further comprises an 8-bit binary counter, which actually consists of two 4-bit binary counters 64 and 66 connected in tandem. Each has A, B, C and D outputs, a signal input S and a reset input R. The two counters 64 and 66 are coupled in tandem by connecting the D output of the 4-bit binary counter 64 to the signal input of the binary counter 66. The counters 64 and 66 function to count the clock pulses that are coupled through the NAND gate 60 and will produce on the combined eight outputs a binary signal representative of the number of pulses. Standard binary logic will show that there are 256 ($2^8$) possible outputs from the two binary counters 64 and 66.

The apparatus 20 further comprises a variable current sink 70, having eight signal inputs A-H respectively coupled to the eight outputs of the binary counters 64 and 66. It also has a reference voltage input I, the voltage for which is provided by means of a pair of resistors 72 and 74 connected in series to a B+ supply voltage, a Zener diode 76 coupled between the junction of the resistors and ground, and a filtering capacitor 78 coupled across the diode 76. A capacitor 80 is connected between the terminals J and K and a resistor 82 is connected from the K terminal to ground. The output terminal L is connected to the junction of the potentiometer 32 and the comparator 34.

Figure 3:
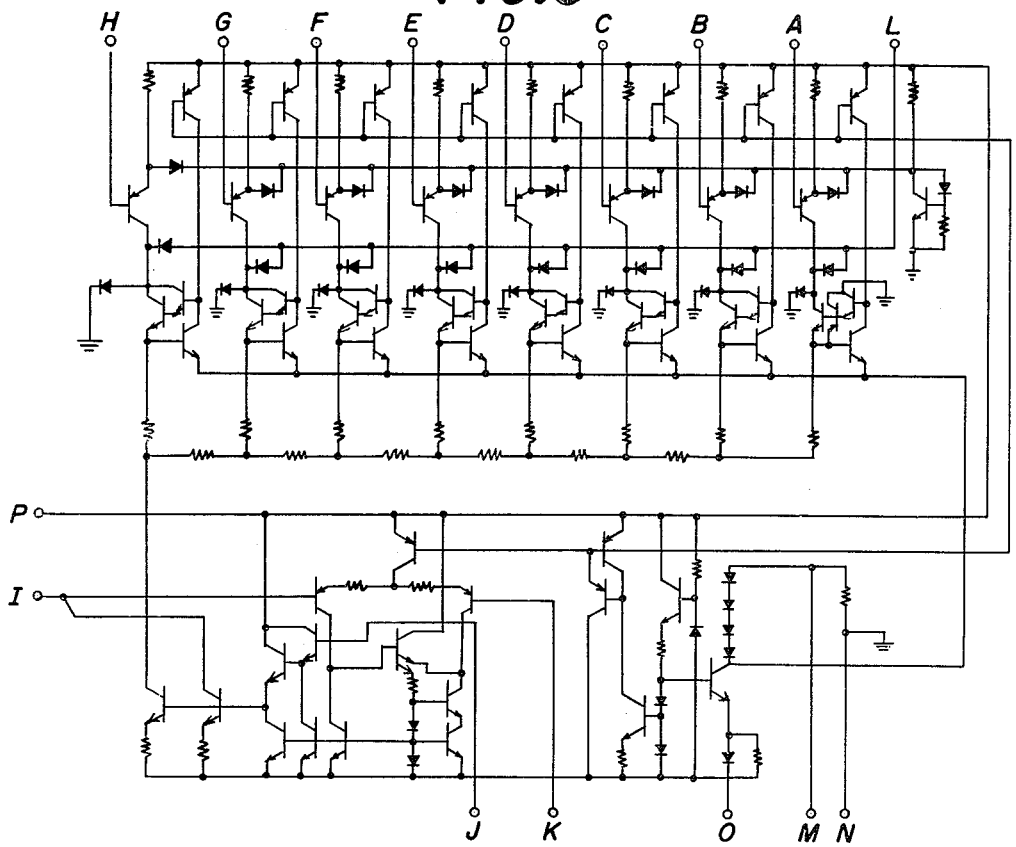
FIG. 3 is a block diagram of the block labeled "variable current sink" in FIG. 2A.

The variable current sink 70 presents an effective sink for current at the L terminal dependent on the binary count at the digital inputs A-H. The greater the number of clock pulses coupled through the NAND gate 60, the greater the number of pulses counted by the counters 64 and 66, the more current is sunk by the variable current sink 70. The elements 72 to 78 provide a reference voltage that determines the maximum current which the sink 70 will divert. Actually, the variable current sink 70 is an 8-bit multiplying digital-to-analog converter, such as the device made by Motorola Semiconductor Products, Inc. of Phoenix, Ariz. under its model no. MC1408. The characteristics of this device are such that with a zero count, that is, zeros at each of the eight digital inputs A-H, the sink will divert no current, whereas at maximum count, that is, when 256 clock pulses have passed through the NAND gate 60 so that both binary counters 64 and 66 will have ones at all eight outputs, the sink 70 will divert a maximum current. For example, where the Zener diode has a 4.3 volt rating and the resistor 72 has a value of 3.1 Kohms, the maximum current diverted by the sink 70 is about 2 milliamps. A block diagram of the sink 70 is shown in FIG. 3 with terminals labeled A–O corresponding to the terminals shown in FIG. 2A. FIG. 1A does not show terminals M-P. Terminals M and N are connected to ground, terminal O is connected to a minus supply voltage, and terminal P is connected to a plus supply voltage.

The variable current sink 70 is coupled to the pressure transducer 22 via the buffer amplifier 30 and is therefore connected in parallel with the comparator 34. The current sink 70 will divert current which would normally be applied to the comparator 34.

In operation, the commencement of a compression pulse, say the pulse 24, will cause current to flow through the potentiometer 32 and into the comparator 34. As long as such current exceeds the threshold level of the comparator 34, its output will stay high to produce an enable signal for the gate 60, which couples clock pulses to the binary counters 64 and 66. The first such pulse will cause the current sink 70 to divert some of the current from the buffer amplifier 30 which would have gone to the comparator 34. The clock pulses continue to step the counters 64 and 66 and thus increase the amount of current diverted by the sink 70, until so much current is diverted that the current delivered to the comparator 34 is insufficient to keep it conducting, thereby disabling the NAND gate 60.

The above operation is occurring during the rise time of the compression pulse 24, whereby additional voltage and thus additional current are provided to increase the current into the comparator 34, causing an enable signal again to be produced which enables the NAND gate 60 and causes more clock pulses to be coupled therethrough, which are in turn counted by the counters 64 and 66 which causes the sink 70 to divert more of the current. The NAND gate 60 will thus be turned on and off to permit additional clock pulses to be passed therethrough until the peak of the compression pulse 24 has been reached. Thereafter no additional current is available to overcome the current diverted by the sink 70, and, therefore, no more clock pulses will be coupled through the NAND gate 60.

Thus, the number of clock pulses coupled through the NAND gate 60 is directly proportional to the amplitude of the pulse 24. A compression pulse 24 having a low amplitude will cause less clock pulses to be coupled through the NAND gate 60 than would a higher amplitude pulse. The potentiometer 32 is adjusted so that the number of pulses coupled through the NAND gate 60 is precisely the pressure in pounds per square inch absolute sensed by the pressure transducer 22. For example, if the peak compression in a given chamber is 162 pounds per square inch absolute, then precisely 162 clock pulses will pass through the NAND gate 60 and if the absolute pressure was 200 psia, then 200 pulses would pass through the NAND gate 60. The potentiometer 32 is calibrated by applying known pressure to the pressure transducer 22.

The output of the pressure transducer 22 is also coupled, by way of a resistor 86, to a square wave generator 88 which includes an operational amplifier 90, a feedback resistor 92 and a load resistor 94. One input of the operational amplifier 90 is coupled to the resistor 86, while the other input is connected to the movable arm of a potentiometer 96 coupled between the B+ supply voltage and ground reference potential. The setting of such movable arm determines the threshold level of the operational amplifier 90. As shown, the output of the square wave generator 88 consists of a sequence of square wave pulses respectively corresponding to the pulses produced by the pressure transducer 22. Three such pulses, labeled 98, 100 and 102, have been shown and respectively correspond to the pulses 24, 26 and 28. If the amplitude of the pulses 24–28 is less than the threshold value of the square wave generator 88 as established by the potentiometer 96, then the square wave generator 88 will produce no output. This is to insure that noise does not produce extraneous signals.

The square wave is coupled through an inverter 106 to the reset inputs of the binary counters 64 and 66. During the high portions of the square wave, the reset inputs are zero, and the binary counters 64 and 66 can count the clock pulses being applied thereto. Thus, during the presence of the pulse 98, the reset inputs of the counters 64 and 66 are zero so that all clock pulses coupled therethrough during such interval can be counted. At the end of the pulse 98, the output of the square wave generator 88 becomes low, thereby resetting the counters 64 and 66 so that they can start counting again during the next pulse 100. Similarly, after termination of the pulse 100, the counters 64 and 66 are reset so that clock pulses can be counted during the third compression pulse.

The square wave from the square wave generator 88 is also coupled as the final input to the NAND gate 60. This insures that the NAND gate 60 is off or disabled in the interval between pulses so that noise and other extraneous informaion cannot activate the same.

The square wave from the square wave generator 88 is also coupled to one input of a NOR gate 108, the output of which is coupled to one input of an operational amplifier 109, the other input of which is connected to the movable arm of the potentiometer 96. The output of the op amp 109 is coupled through the resistor 110 through an indicator such as a lamp 111 to the B+ supply voltage. The square wave causes the op amp 109 alternately to be conductive and nonconductive which causes the lamp 11 to flash on and off. This signifies to the mechanic that compression pulses are being received by the apparatus 20 and are being analyzed thereby.

The output of the NOR gate 108 is coupled to the signal input S of a BCD counter 112, which also has a reset input R and four binary outputs A, B, C and D. Using standard binary logic, the first compression pulse (not shown) causes just the A output to become high, the second pulse (not shown) causes just the B output to become high, the third pulse (not shown) causes both the A and B outputs to become high, and the fourth pulse (not shown) causes just the C output to become high. The fifth pulse 98 causes the A and C outputs to become high, the sixth pulse 100 causes the B and C outputs to become high, the seventh pulse causes the A, B and C outputs to become high, the eighth pulse (not shown) causes only the D output to become high.

The control signal on the D output of the counter 112 is coupled back to the second input of the NOR gate 108, thereby disabling it during the eighth compression pulse to preclude further pulses from being applied to the counter 112. The NOR gate 108 may be viewed as a switch to open the path to the counter 112. The D output is also coupled to the first input of an operational amplifier 113, the second input of which is connected to the movable arm of the potentiometer 96. The output of the op amp 113 is connected by way of resistor 114, through an indicator such as a lamp 116 to the B+ supply voltage. The eighth compression pulse causes the D output of the counter 112 to become high, thereby enabling the amplifier 113 to illuminate the lamp 116. The mechanic is thereby apprised that information reflecting the peak compression has been received and is awaiting readout.

The apparatus 20 further comprises a set of three counting channels 120a, 120b and 120c. The channel 120a includes a four-input NAND gate 122a, a set of BCD counters 124a and a set of electronic switches 126a. The channels 120b and 120c have the same elements labeled with the same reference numerals but followed by corresponding letter suffixes.

The A, B and C outputs of the BCD counter 112 are coupled respectively to the A, B and C inputs of the NAND gates 122a, 122b and 122c. The A output of the BCD counter is coupled to the A input of the NAND gate 122b through an inverter 121 while the B output of the BCD counter 112 is coupled to the B input of the NAND gate 122c through an inverter 123. Thus, the code 101 appearing on the A, B and C outputs of the BCD counter 112 during the fifth pulse constitutes a gating signal to gate on the NAND gate 122c. The code 110 appearing respectively on the A, B and C outputs of the BCD counter 112 during the sixth pulse constitutes a gating signal to render operative the gate 122b. The 111 code appearing on the A, B and C outputs of the BCD counter 112 during the seventh pulse constitutes a gating signal for the NAND gate 122a.

The clock pulses which were coupled through the NAND gate 60 during the fifth compression pulse are coupled through the gate 122c which is rendered conductive during such compression pulse. These clock pulses are counted in the BCD counters 124c which also store such information. The sixth compression pulse renders the gate 122b operative so that the clock pulses which were coupled through the NAND gate 60 are coupled through such NAND gate 122b to the BCD counters 124b, which counts the clock pulses and stores the number counted. Similarly, the seventh pulse produces a gating signal that operates the gate 122a to couple the clock pulses which had been passed by the gate 60. The clock pulses passing through the gate 122a are counted in the BCD counters 124a and the count is also stored therein. To reset the counters 124a–c, there is provided a manually operated switch 125, the closure of which simultaneously resets the counter 112.

The A, B and C inputs of the gate 122a may be viewed as the combined control input of the channel 120a. Similarly, the control input of the channel 120b consists of the A, B and C inputs of the gate 122b. Finally, the control input of the channel 120c consists of the three inputs A, B and C of the gate 122c. The signal inputs of the three channels 120a–c respectively are the D inputs of the gates 122a–c.

The electronic switches 126a, 126b and 126c are respectively coupled to terminals 134a, 134b and 134c of a manually operated rotary switch 137 having a movable contact 136. Such terminals are respectively coupled through resistors 138a–c to the B+ supply voltage. The electronic switches 126a, b and c have three sets of binary outputs 127a, 128a and 129a respectively representing hundreds, tens and ones. The four binary outputs 127a are interconnected with the corresponding outputs 127b and 127c. Similarly, the binary outputs 128a, b and c are interconnected and the outputs 129a, b and c are interconnected.

The apparatus 20 further comprises three BCD-to-seven-segment decoder/drivers 150, 152 and 154 each having a BCD input. The BCD input of the decoder/driver 150 is coupled to the outputs 127a, b and c. The input to the decoder/driver 152 is connected to the outputs 128a, b and c, and the input to the decoder/driver 154 is connected to the outputs 129a, b and c.

Each of the decoder/drivers has seven outputs, although only one is shown. The decoder/drivers 150, 152 and 154 convert the BCD input information to information respectively to drive seven-segment displays 156, 158 and 160. The combination of a decoder/driver and its associated display may be considered an annunciator. For example, the code 0001 at the input to the decoder/driver 150 will produce a "1" on the display 156, a code of 0110 on the input to the decoder/driver 152 will cause a "6" to appear on the display 158, and a 0010 input to the decoder/driver 154 will cause a "2" to appear on the display 160.

With the manual switch 137 in the condition shown in FIG. 2B, the information that has been applied to the BCD counters 124a, b, and c will remain stored therein. The mechanic will know that such information has been stored because the lamp 116 has been lit. He then operates the switch 137 such that the contact 136 engages the terminal 134a, thereby energizing the electronic switches 126a to couple the information in the BCD counters 124a to the decoder/drivers 150, 152 and 154 which convert the information supplied thereto into digits on the displays 156, 158 and 160. The switch 137 is then operated to cause the contacts 136 to engage the terminal 134b, whereby the information stored in the counters 124b is coupled through the electronic switches 126b to the decoder/drivers 150, 152 and 154 which converts the information to cause the appropriate numbers to become illuminated on the displays 156, 158 and 160. Finally, the switch 137 is moved to its third position in order to provide a reading representative of the information stored in the BCD counter 124c.

In operation, suppose it is desired to measure the peak compression in the three chambers corresponding to one rotor of a rotary engine. The corresponding spark plug is removed and replaced by the pressure transducer 22. When the engine starter is then operated, the corresponding rotor will rotate causing a sequence of pulses to be produced by the pressure transducer 22. These pulses are converted to square wave pulses by the square wave generator 88. The square waves cause the lamp 111 to flash on and off signifying to the mechanic that compression pulses are being received by the apparatus 20. The square wave pulses are counted in the BCD counter 112. The first through fourth pulses are ignored by virtue of the manner in which the outputs are connected, but the fifth compression pulse causes a gating signal which renders the gate 122c operative. The sixth compression pulse results in a gating signal produced by the BCD counter 112 to render operative the gate 122b and the seventh compression pulse results in a gating signal from the BCD counter 112 to render operative the gate 122a. The eighth compression pulse causes the D output of the BCD counter 112 to become high, thereby precluding the NOR gate 108 from coupling further pulses to the BCD counter 112. Such eighth pulse also causes the lamp 116 to light to apprise the mechanic that information on peak compression has been stored and can at this time be read out.

While the gates 122a, b and c are being sequentially gated on during the fifth, sixth and seventh pulses, clock pulses are being coupled through the gate 60 in a quantity directly proportional to the amplitude of the compression pulse.

Suppose that the peak compression in each of the three chambers is 162 psi meaning that the amplitudes of the three compression pulses will be the same. In such case, 162 clock pulses will have been coupled through the NAND gate 60. The NAND gate 122c having been rendered operative by the gating signal resulting from the fifth compression pulse, coupled the 162 clock pulses to the BCD counter 124c, which counts the clock pulses and stores information indicating that there had been 162 received.

Continuing with the example that the pressure in each of the three chambers is 162 psi, then during the sixth pulse 162 clock pulses will have been coupled through the gate 60. These clock pulses are in turn coupled through the gate 122b which is rendered conductive by the gating signal resulting from the sixth compression pulse. The 162 pulses are counted in the BCD counters 124b and information representative of that number is stored therein. Similarly, if the peak compression of the third chamber is also 162, then 162 pulses will be coupled through the gate 60 which in turn are coupled through the gate 122c having been rendered operative by the gating signal resulting from the seventh compression pulse. The BCD counters 124c counts 162 pulses and stores such count. The eighth compression pulse illuminates the lamp 116 so that the mechanic knows that information on the peak compression in the three chambers of the rotary engine has been stored. It should be noted that the entire time to store the information can take no longer than 1 to 1½ seconds.

In the above example, it is assumed that the peak compression in each of the three chambers was 162 psi. Of course, if the peak compressions were different, the appropriate reading would appear on the displays 156, 158 and 160. A similar sequence of steps can be employed to measure the peak compression in the chambers associated with other rotors of the rotary engine.

Figure 4:
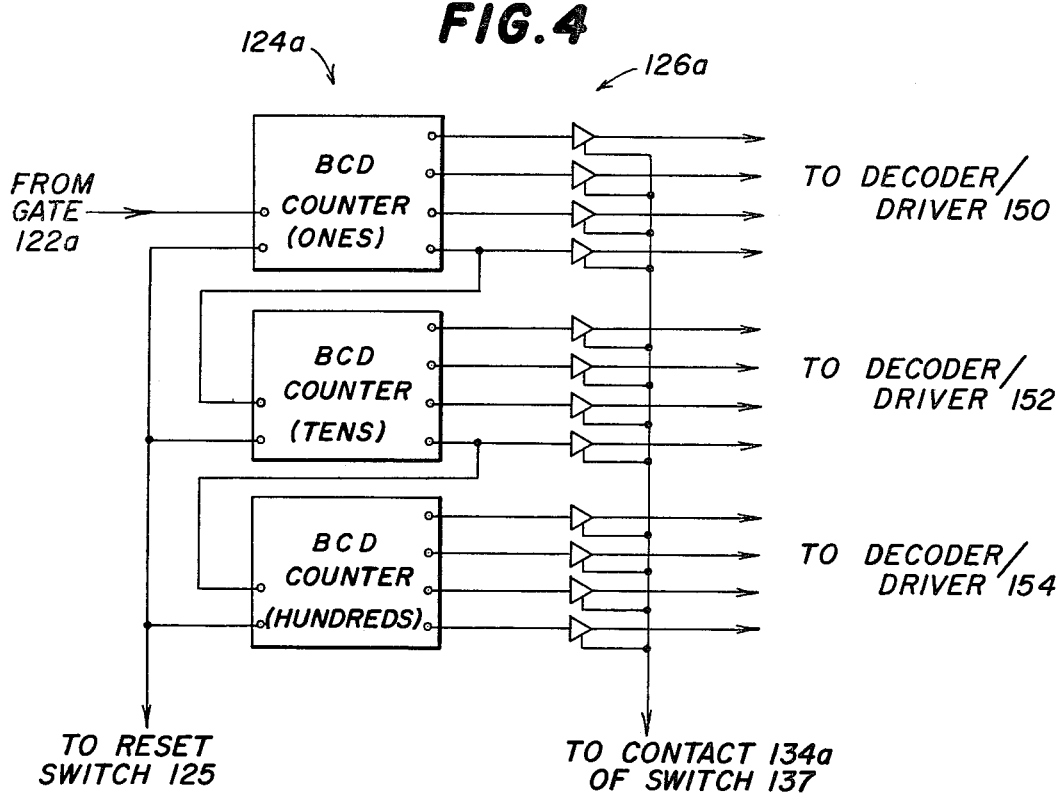
FIG. 4 is a block diagram of one of the three counting channels in FIG. 2 including one of the blocks labeled "BCD counters" and the corresponding block labeled "electronic switches"

Turning now to FIG. 4, details of one of the sets of BCD counters 124a, and one of the sets of electronic switches 126a will be described. It is understood that the BCD counters 124b and 124c are identical to the set of counters 124a and the sets of electronic switches 126b and 126c are identical to the electronic switches 126a. The set of BCD counters 124a includes three BCD counters respectively for ones, tens and hundreds connected in the usual way. The electronic switches actually comprise amplifiers which have their supply voltage input coupled together and to the terminal 134a of the switch 137. When B+ is applied to the terminal 134a, all twelve amplifiers are rendered operative respectively to close the electronic switches 126a and couple the information stored in the BCD counters to the decoder/drivers 150, 152 and 154.

Although the apparatus 20 is designed to measure peak compression in the chambers of a rotary internal combustion engine, it may be used to measure compression in the nonrotary type engine. In such case, when the pressure transducer 22 is inserted in place of a spark plug, the readings on the displays 156, 158 and 160 for all three channels will be identical.

The above described apparatus 20 is particularly well suited for providing accurate digital readings of peak compression of internal combustion rotary engines. The number of clock pulses is directly related to the pressure reading in pounds per square inch so that simply by counting the clock pulses, the peak compression can be determined. To minimize the effect of extraneous signals such as noise, the clock gate is turned off between pulses. The apparatus 20 has one indicator to apprise the mechanic that compression pulses are being received and a second indicator to tell him that the compression pulses have been processed, are being stored and can be read out at that time. The use of the transducer 22 as opposed, for example, to sensing engine current is advantageous in that the effect on the readings by extraneous factors is minimized. For example, battery voltage and ground series resistance variations have negligible effect on the readings. Furthermore, a fixed number of compression pulses is ignored, and it is only the sequence of subsequent compression pulses which are analyzed. In the above embodiment, four such pulses are ignored and the ensuing three pulses are analyzed. This insures that the engine has reached a steady state condition.

Turning now to FIG. 5, there is shown an apparatus 180 for measuring peak compression, constituting a second embodiment of the present invention. The apparatus 180 comprises a transducer 182 which provides a sequence of compression pulses. A comparator 184 has its threshold set by a voltage reference source 186. When the amplitude of the compression pulses from the transducer 182 exceeds the value of the reference source, the pulses are applied to a normally closed gate 188. The pulses are coupled therethrough to a binary counter 190 which provides binary information representative of the number of compression pulses. The eighth pulse produces a disable signal which is coupled back to the gate 188 to open the same and preclude additional compression pulses from being applied to the counter 190. Information corresponding to the eighth pulse is also applied to a comparator 192 that has its reference established by the reference source 186. The information corresponding to the eighth pulse results in the comparator 192 producing an output to activate an indicator 194, signifying that the fifth, sixth and seventh compression pulses have been analyzed by the apparatus 180 and information corresponding to the peak compressions has been stored.

The apparatus 180 further comprises a BCD-to-decimal converter 196 which converts the binary information from the counter 190 to decimal information. The converter 196 has three outputs on which sequentially appear gating signals corresponding to the fifth, sixth and seventh compression pulses. It is to be understood that the converter 196 can be readily modified to produce gating signals in response to any sequence of three pulses. The fifth, sixth and seventh such pulses occur after the engine has reached a steady state condition.

The apparatus 180 further comprises three analog switches 198, 200 and 202, each having a control input respectively coupled to the three outputs of the BCD-to-decimal converter 196. Each of the analog switches also has a signal input coupled to a buffer amplifier 204 in turn coupled to the pressure transducer 182. Compression pulses produced by the pressure transducer 182 are amplified by the buffer amplifier 204 and applied simultaneously to all three of the analog switches 198, 200 and 202. Because no gating signals are produced by the converter 196 during the occurrence of the first through fourth compression pulses, none of them is coupled through the analog switches. However, during the fifth compression pulse the gating signal by the converter 196 renders the analog switch 198 operative to couple therethrough the fifth compression pulse. Similarly, the analog switch 200 is rendered operative by the gating signal during the sixth compression pulse to couple that pulse therethrough. Finally, the seventh compression pulse at the output of the buffer amplifier 204 is coupled through the analog switch 202 by virtue of its having been closed by the corresponding gating signal from the converter 196. The fifth, sixth and seventh compression pulses having been coupled through the analog switches 198, 200 and 202 are respectively applied to peak detectors 206, 208 and 210 which measure the amplitude of the pulses. That information is supplied to and stored respectively in analog memories 212, 214 and 216. These memories have reset inputs coupled together and to a reset circuit 218. Associated with the reset circuit 218 is a switch (not shown) which when activated produces a voltage to reset the memories 212, 214 and 216 after readings corresponding to the amplitudes of the compression pulses have been taken. The reset circuit 218 is also coupled to the reset input of the counter 190 so that it too can be simultaneously reset after the readings have been taken.

The analog memories 212, 214 and 216 are respectively coupled to FET amplifiers 220, 222 and 224, the outputs of which can be coupled to an analog or digital meter (not shown). Such meter could be calibrated so as to indicate the actual peak compression in the engine chambers.

What has been described in this embodiment is compression measuring apparatus in which the compression of the chambers of an internal combustion engine is measured after a fixed number of compressions has occurred, so that the engine reaches a steady state condition. The apparatus 180 employs a pressure transducer 182 that replaces the spark plug, to measure the compression in the chambers so that the influence on the electrical signal by factors other than compression is kept at a minimum. Furthermore, the apparatus 180 includes an indicator 194 to apprise the mechanic that the apparatus 180 has made and stored measurements of the compression in the three chambers of a rotary engine.

I claim:

1. Apparatus for measuring peak compression in each of a plurality of compression chambers of an internal combustion engine, said apparatus comprising means for producing a sequence of compression pulses respectively corresponding to the compressions in the chambers, means coupled to said compression pulse producing means for producing a sequence of a plurality of gating signals corresponding in number to the number of compression chambers and respectively in substantial time coincidence with compression pulses subsequent to the second one of said compression pulses, a plurality of channels coupled in parallel and corresponding in number to the number of chambers of which the compression is to be measured, each of said channels having detecting means and memory means, a signal input coupled to said compression pulse producing means and a control input coupled to said gating signal producing means and being operative to detect the amplitude of the compression pulses and to store information representative of such amplitude.

2. The apparatus of claim 1, wherein said compression pulse producing means is a transducer constructed to replace a selected spark plug in an internal combustion engine and being adapted to provide compression pulses corresponding to the compressions in the associated compression chamber.

3. The apparatus of claim 1, wherein said gating signal producing means is operative to produce a control signal after said plurality of gating signals has been produced, and further comprising indicator means coupled to receive said control signal and responsive thereto for indicating that information representative of the amplitudes of the compression pulses has been stored in said channels.

4. The apparatus of claim 1, wherein said gating signal producing means is operative to produce a sequence of a plurality of gating signals respectively during and in substantial time coincidence with the fifth, sixth, and seventh compression pulses.

5. The apparatus of claim 1, and further comprising switch means coupling said compression pulse producing means to said gating signal producing means, said switch means being normally closed to couple the sequence of compression pulses to said gating signal producing means, said gating signal producing means being operative to produce a control signal after said plurality of gating signals has been produced, said switch means having a control input coupled to receive said control signal and responsive thereto for precluding further compression pulses from being coupled to said gating signal producing means.

6. The apparatus of claim 1, and further comprising buffer means coupled between said transducer means and said channels.

7. The apparatus of claim 1, and further comprising annunciator means coupled to each of said channels for expressing information stored therein.

8. The apparatus of claim 1, wherein each of said channels includes gate means and counter/memory means and switching means.

9. The apparatus of claim 1, wherein each of said channels includes gate means and detector/memory means, said gate means having an output and a signal input coupled to said compression pulse producing means and a control input coupled to said gating signal producing means, said gate means being rendered operative by a gating signal to couple compression pulses to the output thereof, said detector/memory means being coupled to said gate means and being operative to detect the amplitude of the compression pulses coupled through said gate means and to store information representative of such amplitude.

10. The apparatus of claim 9, and further comprising means for manually resetting said detector/memory means.

11. Apparatus for measuring peak compression in each of a plurality of compression chambers of an internal combustion engine, said apparatus comprising means for producing a sequence of compression pulses respectively corresponding to the compressions in the chambers, comparator means coupled to said transducer means and being responsive to current caused by the compression pulses exceeding a threshold level to produce an enable signal, circuit means including a clock for producing a sequence of clock pulses at a frequency many times the frequency of the compression pulses, said circuit means having an output and a control input coupled to said comparator means, said circuit means being responsive to said enable signal to couple clock pulses to said output and being responsive to the absence of said enable signal to isolate the clock pulses from said output, feedback counter means coupled to the output of said circuit means for counting clock pulses coupled therethrough, said feedback counter means having a reset input coupled to receive the compression pulses and being reset after the peak of each compression pulse, a variable current sink coupled to said feedback counter means and being operative to drain a quantity of current that increases with the number of clock pulses applied thereto, said variable current sink being coupled to said transducer means and in parallel with said comparator means and being operative to divert current therefrom in accordance with the value of said sink, the commencement of a compression pulse causing current to said comparator means to be greater than said threshold level to enable said circuit means to couple the clock pulses to the output thereof, said feedback counter means counting the clock pulses to increase the current diverted by said variable current sink and thereby decrease the current to said comparator means below said threshold level to preclude additional clock pulses from being coupled to the output of said circuit means, whereupon current into said comparator means again increases above said threshold level to cause said circuit means then to couple to the output thereof additional clock pulses which are further counted by said feedback counter means to increase the current diverted by said variable current sink, said circuit means thereby being periodically enabled to couple to the output thereof clock pulses until the amplitude of the compression pulse reaches a peak and begins to decrease, means for producing a sequence of a plurality of gating signals corresponding in number to the number of compression chambers and respectively corresponding to the compression pulses, a plurality of counting channels coupled in parallel and corresponding in number to the number of chambers of which the compression is to be measured, each channel having a signal input coupled to the output of said circuit means and a control input coupled to said gating signal producing means, each channel being rendered operative by a gating signal to count the clock pulses and to store such count, and annunciator means coupled to said counting channels for expressing information in accordance with the counts stored therein.

12. The apparatus of claim 11, and further comprising indicator means coupled to said compression pulse producing means for indicating that compression pulses are being received.

13. The apparatus of claim 11, wherein said compression pulse producing means is a transducer constructed to replace a selected spark plug in an internal combustion engine and being adapted to provide compression pulses corresponding to the compressions in the associated compression chamber.

14. The apparatus of claim 13, and further comprising buffer means for coupling the compression pulses from said transducer to said comparator means and to said variable current sink.

15. The apparatus of claim 14, and further comprising calibration means in series with said buffer means and being variable to enable the number of pulses passed by said circuit means accurately to correspond to the amplitude of the compression pulses.

16. The apparatus of claim 11, and further comprising means for generating square waves in response to the compression pulses when the amplitude of said compression pulses exceeds a threshold level, said gating signal producing means being coupled to said square wave generating means.

17. The apparatus of claim 16, wherein said circuit means has a further control input coupled to said square wave generating means and being operative to couple clock pulses to its output only in the presence of said square wave.

18. The apparatus of claim 16, wherein the reset input of said feedback counter means is coupled to said square wave generator means.

19. The apparatus of claim 11, wherein said circuit means further includes a clock gate having a signal input coupled to said clock and a control input coupled to said comparator means and an output corresponding to the output of said circuit means, said clock gate being responsive to said enable signal to couple clock pulses to the output thereof and being responsive to the absence of said enable signal to isolate the clock pulses from said output.

20. The apparatus of claim 19, wherein said clock gate is a NAND gate.

21. The apparatus of claim 11, wherein the frequency of the clock pulses is more than 30,000 times the frequency of the compression pulses.

22. The apparatus of claim 11, wherein said feedback counter means is an 8-bit counter and said variable current sink is an 8-bit multiplying digital-to-analog converter, whereby up to 256 clock pulses can be passed by said circuit means.

23. The apparatus of claim 11, wherein said gating signal producing means is operative to produce a sequence of a plurality of gating signals respectively during and in substantial time coincidence with the fifth, sixth, and seventh ones of the compression pulses.

24. The apparatus of claim 11, wherein said gating signal producing means includes a BCD counter.

25. The apparatus of claim 11, and further comprising switch means coupling said compression pulse producing means to said gating signal producing means, said switch means being normally closed to couple the sequence of compression pulses to said gating signal producing means, said gating signal producing means being operative to produce a control signal after said plurality of gating signals has been produced, said switch means having a control input coupled to receive said control signal and responsive thereto for precluding further compression pulses from being coupled to said gating signal producing means.

26. The apparatus of claim 11, wherein said gating signal producing means is operative to produce a control signal after said plurality of gating signals has been produced, and further comprising indicator means coupled to receive said control signal and responsive thereto for indicating that counts representative of the amplitudes of the compression pulses have been stored in said counting channels.

27. The apparatus set forth in claim 11, wherein each of said counting channels includes gate means and counter/memory means and switching means, said gate means having a signal input coupled to the output of said circuit means and a control input coupled to said gating signal producing means and an output, said gate means being rendered operative by a gating signal to coupled clock pulses therethrough, said counter/memory means being coupled to said gate means and being operative to count the clock pulses coupled through said gate means and to store such count, said switching means being coupled to said counter/memory means, said switching means being selectively closeable to couple a selected counter/memory means to said annunciator means.

28. The apparatus of claim 27, wherein said counter/memory means in each of said channels is a BCD counter.

29. The apparatus of claim 27, wherein the switching means in each of said counting channels includes electronic switching means coupling the associated counter/memory means to said annunciator means, and further comprising a manual switch coupled to the electronic switches in said channels and manually operable to close the electronic switches in selected ones of said channels.

30. The apparatus of claim 11, wherein said annunciator means includes three BCD-to-7-segment decoder/drivers and three 7-segment displays respectively coupled thereto.

* * * * *